US006547092B1

(12) United States Patent
Chervatsky

(10) Patent No.: US 6,547,092 B1
(45) **Date of Patent: *Apr. 15, 2003**

(54) PRESSURE VESSEL WITH THIN UNSTRESSED METALLIC LINER

(76) Inventor: Solomon Chervatsky, 10/18 Aharoni Street, Rehovot 76281 (IL)

( * ) Notice: Subject to any disclaimer, the term of this patent is extended or adjusted under 35 U.S.C. 154(b) by 11 days.

This patent is subject to a terminal disclaimer.

(21) Appl. No.: 09/711,794

(22) Filed: Nov. 14, 2000

(51) Int. Cl.[7] .................... B23P 17/00

(52) U.S. Cl. .................... 220/581; 220/585; 220/586; 220/590

(58) Field of Search .................... 220/581, 585, 220/586, 590, 4.13

(56) References Cited

U.S. PATENT DOCUMENTS 1,968,088 A * 7/1934 Mekler
2,507,778 A * 5/1950 Frey
3,066,822 A * 12/1962 Watter
3,446,385 A * 5/1969 Ponemon
3,969,812 A * 7/1976 Beck .................... 220/590
5,918,759 A * 7/1999 Beckmann et al. .................... 220/586
6,145,692 A * 11/2000 Cherevatsky .................... 220/581

* cited by examiner

*Primary Examiner*—Joseph M. Moy
(74) *Attorney, Agent, or Firm*—Mark M. Friedman

(57) ABSTRACT

A pressure vessel for containing a fluid at elevated pressure features an unstressed corrugated metallic liner forming part of a hermetic seal. The liner has corrugations extending parallel to a first direction to accommodate deformation in a second direction perpendicular to the first direction. Around the liner is a filler layer of elastic material forming a contiguous layer adjacent to the external surface of the liner and filling the corrugations. An external primary load-bearing container has at least one wall made of fiber-reinforced composite material adjacent to the filler layer. The shape of the primary container, the reinforcing directions of the fiber-reinforced composite material, and the mechanical properties of the filler layer are configured such that, under a given change in the pressure of the contained fluid, a strain caused in the liner parallel to the first direction is at least one order of magnitude less than a corresponding strain in the second direction.

12 Claims, 3 Drawing Sheets

PRESSURE VESSEL WITH THIN UNSTRESSED METALLIC LINER

FIELD AND BACKGROUND OF THE INVENTION

The present invention relates to pressure vessels and, in particular, it concerns a pressure vessel which has a thin unstressed metallic liner.

A number of different structures are known for containing fluids at elevated pressures. These structures are generally referred to as "pressure vessels". Requirements of safety, as well as attempts to reduce weight, have lead away from the use of simple metallic pressure vessels towards use of reinforced composite materials. In order to provide the required sealing characteristics, however, an additional inner liner must be provided. Hence the two principal types of pressure vessel currently in use both employ reinforced composite containers with either a seamless metallic or thermoplastic liner.

The use of a metallic liner generally provides a much longer operational life, better resistance to harsh environments, and better sealing characteristics than thermoplastic liners. The design of pressure vessels with metallic liners, however, presents its own particular problems, as will now be described.

Composite pressure vessels with metallic liners are manufactured by filament winding of fibers impregnated with resin matrix, together forming the composite material, around the metallic liner. The metal liner of these structures bears part of the applied internal pressure. In addition, incompatibility of the ranges of elastic behavior of the metal liner and composite material lead to residual compression stresses in the liner as a result of the "proof pressure" test ("autofrittage phenomenon").

During subsequent application of internal pressure, the liner stretches and experiences corresponding tensile stress. In order to withstand these tension/compression stresses through repeated filling cycles over an extended period of usage, the liner must be relatively thick. Besides the clear implications of a thick liner for the weight of the vessel, the presence of a thick metallic layer also leads to safety problems.

In an effort to address these problems, attempts have been made to develop an unstressed metallic liner in which a thin metallic layer provides sealing properties while transferring all of the pressure load to the surrounding primary vessel. An example of such a structure is described in U.S. Pat. No. 5,292,027 to Lueke.

In order to avoid stressing of the liner, Lueke suggests a complicated "herringbone" pattern of parallelogram-like elements which provides undulations in two orthogonal directions. As a result, the liner readily stretches in any direction to conform to the deformation of the primary vessel.

The structure suggested by Lueke presents numerous problems of practical implementation. Firstly, the liner appears to contact the primary vessel at isolated points. Pressure applied to such a structure would not be effectively transferred to the primary vessel walls, and would probably result in immediate destruction of the herringbone pattern. Furthermore, the complicated structure would be extremely difficult to manufacture.

Another reference, U.S. Pat. No. 1,968,088 to Mekler, although less relevant than the Lueke reference, will be mentioned for its superficial similarity to one embodiment of the present invention. Mekler, in a patent filed before the introduction of reinforced composite materials into the art, describes a freely-expanding, corrugated protective liner for reaction vessels subjected to rapidly varying temperatures. The corrugations serve to prevent distortion and damage to the liner under extreme heat stress, while insulating the main vessel from the most extreme of the temperature variations. The reference does not address issues of performance under elevated pressure.

The structure described by Mekler is not suitable for use with fluids at elevated pressures. Since no solution is suggested for accommodating heat stress along the direction of elongation of the corrugations, it would appear that the liner must have a clearance from the ends of the primary vessel. As a result, the liner must be designed to bear a large proportion of any internal pressure. Additionally, no support is provided for the corrugations of the liner. Thus, if the liner was made from thin materials, the corrugated structure would rapidly deform and collapse under internal pressure. Finally, since this reference pre-dates the use of reinforced composite materials, Mekler clearly fails to teach any synergy between a liner structure and specific configurations of such composite materials.

Finally, reference is made to U.S. Pat. No. 3,446,385 to Ponemon which proposes the concept of a relatively unstressed metallic liner within a fiber glass reinforced load-bearing container. Several examples given (FIGS. 6 and 7 of the Ponemon reference) propose to achieve this using a bi-directional corrugated pattern, conceptually similar to, but less feasible than, that suggested by the aforementioned Lueke reference.

In the examples of FIGS. 3–5, Ponemon provides a liner structure which can accommodate stress in one direction only. With regard to stress in other directions, Ponemon suggests choosing a filament winding angle of slightly more than, or slightly less than, 54°45' which, he claims, generates deformations selectively in the required directions.

In fact, the solution proposed by Ponemon is based upon a fallacy and is non-operative. Specifically, Ponemon states: "It is known that winding filaments at a helical angle of 54°45' within a tolerance of 1 degree produces an elongation in the glass fibers that is oriented in only one direction. That is, if the winding helical angle is greater than 54°45', the elongation of the glass fibers will be only in the longitudinal direction of the axis of the vessel; whereas, if the helical winding angle is less than 54°45', the elongation of the glass fibers is in the transverse or hoop direction of the vessel."

The angle of 54°45' is indeed a well known winding angle: it is the angle at which axial and hoop deformations in a cylindrical pressure vessel are equal. However, the suggestion that pure axial or pure hoop deformations may be obtained by shifting one degree to either side of this value is completely fallacious. To the contrary, angles in the stated region to either side of the 54°45' angle will typically give very significant though non-equal variations in deformation in both axial and hoop directions. Furthermore, this value corresponds to an unstable singularity around which small variations in angle give rise to large, non-linear variations in deformation, making it an angle to be avoided when self-cancellation of stresses is sought.

There is therefore a need for pressure vessels with thin unstressed metallic liners which are convenient to produce and which effectively transfer applied pressure to the walls of the primary container.

SUMMARY OF THE INVENTION

The present invention is a pressure vessel which has a thin unstressed metallic liner.

According to the teachings of the present invention there is provided, a pressure vessel for containing a fluid at elevated pressure, the pressure vessel comprising: (a) a primary load-bearing container formed with at least one wall made of fiber-reinforced composite material, the shape of the primary container and the reinforcing directions of the fiber-reinforced composite material being configured such that, under a given change in the pressure of the contained fluid, a strain of the wall in a first direction is at least one order of magnitude less than a corresponding strain in a second direction perpendicular to the first direction; (b) an unstressed corrugated metallic liner positioned adjacent to at least part of an inner surface of the wall and forming part of a hermetic seal within the primary container, the liner having corrugations extending substantially parallel to the first direction such that the liner conforms to deformation of the wall in the second direction; and (c) a filler layer of elastic material interposed between the liner and the wall so as to substantially fill raised portions of the corrugations.

According to a further feature of the present invention, the filler forms a substantially contiguous layer between the liner and the inner surface of the wall.

According to a further feature of the present invention, the filler is substantially incompressible.

According to a further feature of the present invention, wherein the filler has a module of elasticity of less than about $10^4$ kg·cm$^{-2}$.

According to a further feature of the present invention, the primary container has a cylindrical portion and dome-shaped end portions, the liner being deployed along substantially all of the inner surface of the cylindrical portion.

According to a further feature of the present invention, the corrugations form circumferential rings within the cylindrical portion.

According to a further feature of the present invention, the corrugations extend parallel to a central axis of the cylindrical portion.

According to a further feature of the present invention, the hermetic seal is completed by at least one additional metallic element, the additional metallic element being sealingly connected to the liner by welding.

According to a further feature of the present invention, the liner is made from metallic material having a given coefficient of thermal expansion, and wherein the internal structure of the fiber-reinforced composite material is configured so as to generate an effective coefficient of thermal expansion of the wall as measured along the first direction substantially equal to the given coefficient.

There is also provided according to the teachings of the present invention, a pressure vessel for containing a fluid at elevated pressure, the pressure vessel comprising: (a) an unstressed corrugated metallic liner forming part of a hermetic seal, the liner having corrugations extending substantially parallel to a first direction such that the liner accommodates deformation in a second direction perpendicular to the first direction, the liner having an external surface; (b) a filler layer of elastic material disposed as a substantially contiguous layer adjacent to the external surface of the liner and substantially filling the corrugations; and (c) a primary load-bearing container surrounding the hermetic seal, the primary container being formed with at least one wall made of fiber-reinforced composite material adjacent to the filler layer, wherein the shape of the primary container, the reinforcing directions of the fiber-reinforced composite material, and the mechanical properties of the filler layer are configured such that, under a given change in the pressure of the contained fluid, a strain caused in the liner parallel to the first direction is at least one order of magnitude less than a corresponding strain in the second direction.

There is also provided according to the teachings of the present invention, a method for producing a pressure vessel for containing a fluid at a given working pressure which is to be tested at a corresponding proof-test pressure, the method comprising: (a) providing a liner made from metallic material and configured so as to accommodate deformation in a first in-plane direction; and (b) constructing around the liner a primary container having a multiple layer wall made from fiber reinforced composite material, the thickness of the layers, the reinforcing directions of fibers within each layer, and the mechanical and physical properties of the fibers in each layer being chosen such that, when the liner is filled with fluid at the proof test pressure, deformation of the liner along a second in-plane direction perpendicular to the first in-plane direction is limited to within the elastic limit of the metallic material.

According to a further feature of the present invention, a layer of elastic filler material is provided between the liner and the primary container, the filler material being substantially incompressible, wherein the thickness of the layers, the reinforcing directions of fibers within each layer, and the mechanical and physical properties of the fibers in each layer of the primary container are chosen such that application of increased pressure within the liner generates a strain in the wall as measured in the second in-plane direction at least one order of magnitude less than the corresponding strain as measured in the first in-plane direction.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a pressure vessel which has a thin unstressed metallic liner.

The principles and operation of pressure vessels according to the present invention may be better understood with reference to the drawings and the accompanying description.

Figure 1:
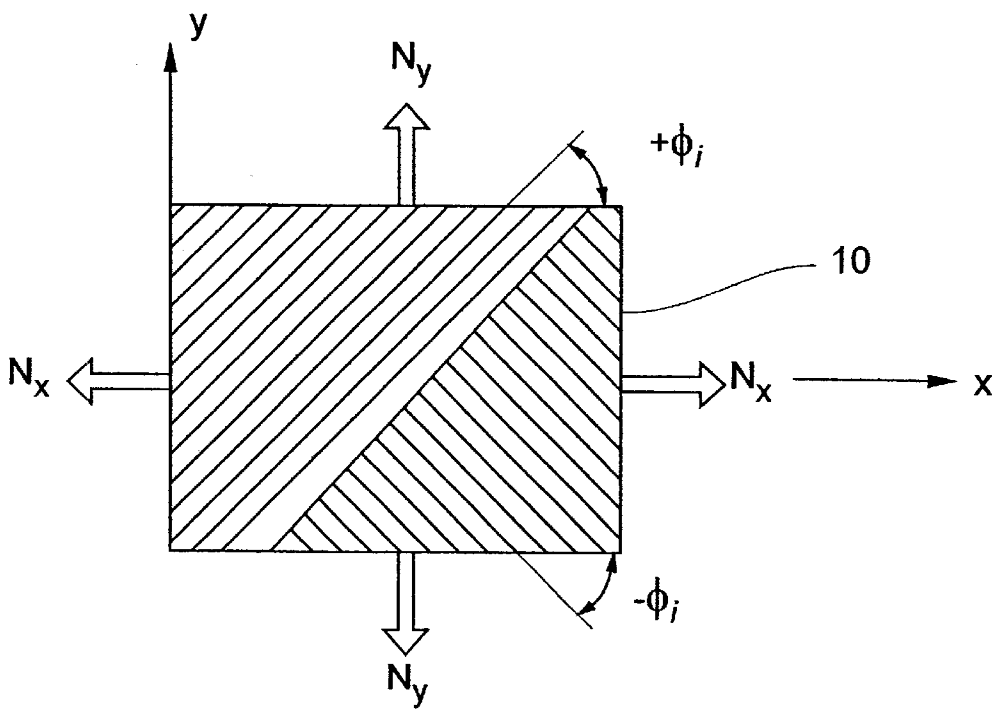
FIG. 1 is a schematic plan view illustrating the definitions of the in-plane loads acting on a section of a pressure vessel wall.

Referring now to the drawings, FIG. 1 introduces certain nomenclature which will be useful in understanding the details of the present invention. Specifically, there is shown a section of wall, generally designated 10, of a pressure vessel. Outward pressure exerted by the fluid is resisted by tensile forces within the wall. For each arbitrary small section 10 of the wall, these forces are shown resolved into two orthogonal in-plane components, designated here $N_x$ and $N_y$. According to the convention used below in the context of a cylindrical structure, $N_x$ is taken to be parallel to the central axis of the cylinder and $N_y$ is in a circumferential direction.

Turning now to FIGS. 2–5, a first embodiment of a pressure vessel, generally designated 12, will now be described. Generally speaking, pressure vessel 12 includes a primary load-bearing container 14 formed with at least one wall 16 made of fiber-reinforced composite material. Adjacent to at least part of an inner surface of wall 16 is an unstressed corrugated metallic liner 18 which forms part of a hermetic sealing shell within primary container 14. Liner 18 has corrugations 20 extending in a first direction, in this case the circumferential "y" direction, which allow liner 18 to conform to any deformation of wall 16 perpendicular to the length of corrugations 20, i.e., in this case parallel to the axial "x" direction. A filler layer 22 of elastic material is interposed between liner 18 and wall 16 so as to substantially fill raised portions of corrugations 20. In order to avoid stressing of the liner in the "y" direction, the shape of primary container 14, the internal structure of the fiber-reinforced composite material, and the mechanical properties of filler layer 22 are configured to greatly reduce, and preferably substantially eliminate, stress applied to liner 18 in that direction as will be described below.

By way of example, the present invention will be illustrated with reference to two specific embodiments having a generally cylindrical vessel shape. This simplifies the calculations required, as will be detailed below. However, it should be appreciated that the invention is not limited to cylindrical shapes, and can be readily adapted to a wide range of other types of vessel.

The present invention is particularly advantageous in that it allows use of a very thin liner to provide the required sealing. Typically, the thickness of the liner is less than about one hundredth of the internal diameter of the vessel, and preferably, between about $5\times10^{-3}$ and about $5\times10^{-4}$ of the internal diameter. Since relatively small quantities of metal are required, it becomes feasible to make the liner from expensive unreactive metals and alloys which do not react with corrosive fluid contents. Examples of materials from which liner 18 may be produced include, but are not limited to, steel, aluminum, copper, nickel and tungsten.

It should be noted that the present invention may be used to advantage with vessels for containing fluids at a wide range of elevated pressures. For smaller vessels of diameter up to about 0.5 m, the vessels of the present invention are typically used for working pressures in excess of about 100 atm., and frequently up to as much as about 300 atm. However, the present invention is not limited to use within these ranges. In particular with larger vessels, the features of the present invention may be used to advantage with vessels for working pressures of tens of atm.

Parenthetically, the term "in-plane", used herein to refer to the directions of loads and strains within the vessel walls, is taken to refer to directions lying within a plane tangential to the general extensional directions of the wall at a given point. Thus, in a cylindrical form, the in-plane directions are along the line of a circumferential ring (to be referred to as the "y" direction) and parallel to the axis of the cylinder (to be referred to as the "x" direction).

Figure 2:
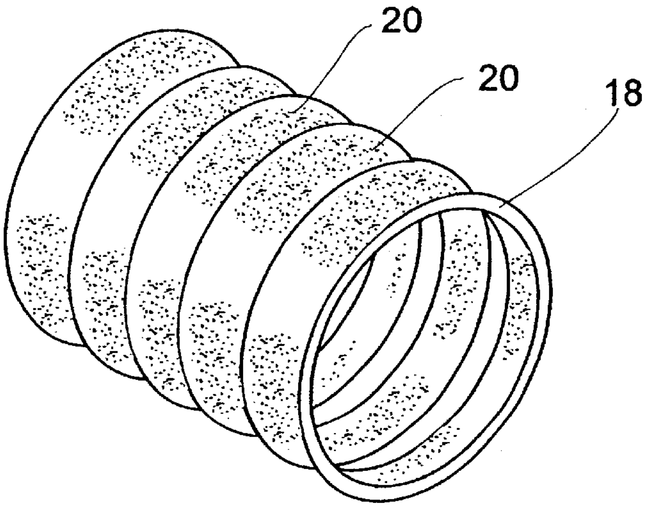
FIG. 2 is a schematic isometric representation of a first corrugated liner for use in a pressure vessel according to a first embodiment of the present invention.

Turning now to the features of pressure vessel 12 in more detail, FIG. 2 shows liner 18, configured to form part of an inner sealing shell of pressure vessel 12 according to the present invention. Liner 14 has a generally cylindrical form featuring a large number of corrugations 20 (shown not to scale) in the form of circumferential rings.

The exact profile of corrugations 20 is typically not critical to the present invention. Preferably, the corrugations are smooth, i.e., without any sharp corners or angles, so as to avoid local concentration of deformation stresses. Typically, a roughly sinusoidal shape is used, although other rounded shapes such as alternating arcuate portions may equally be used.

Figure 3:
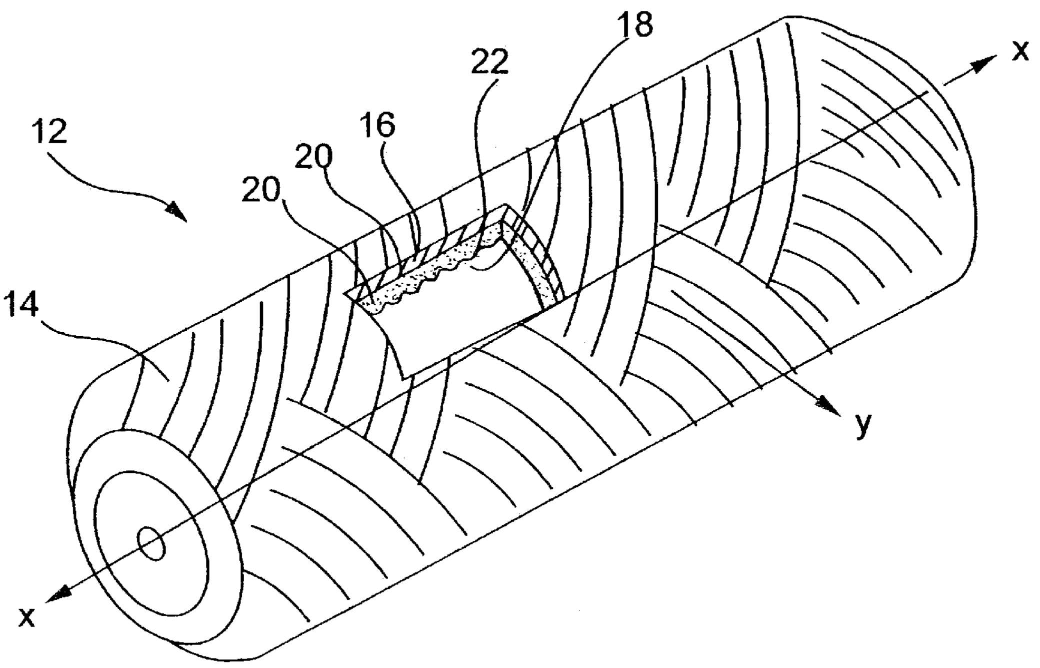
FIG. 3 is a partially cut-away isometric view of a pressure vessel according to the first embodiment of the present invention.
Figure 4:
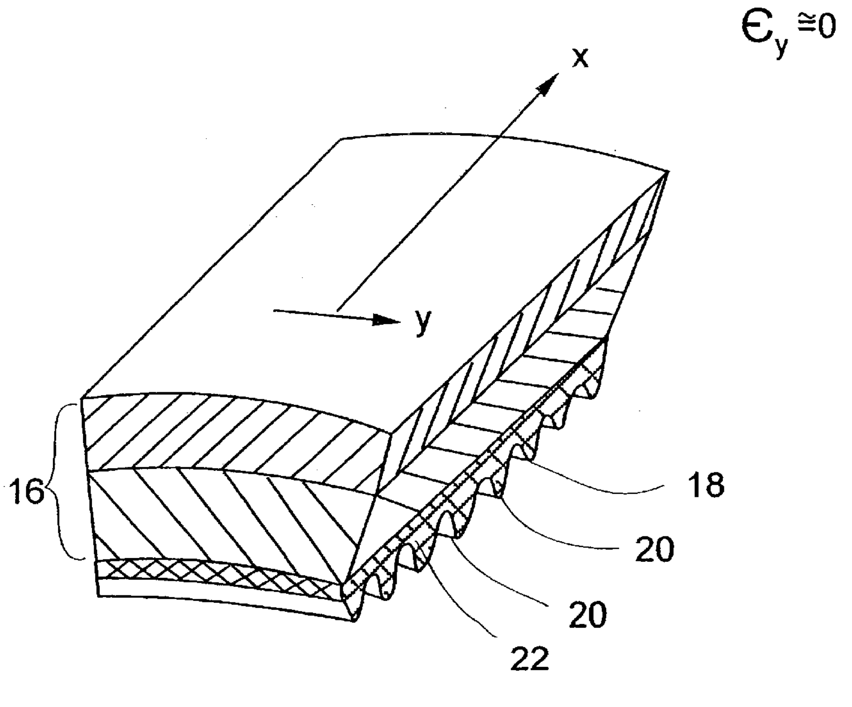
FIG. 4 is an enlarged view of the cut-away section of FIG. 3.
Figure 5:
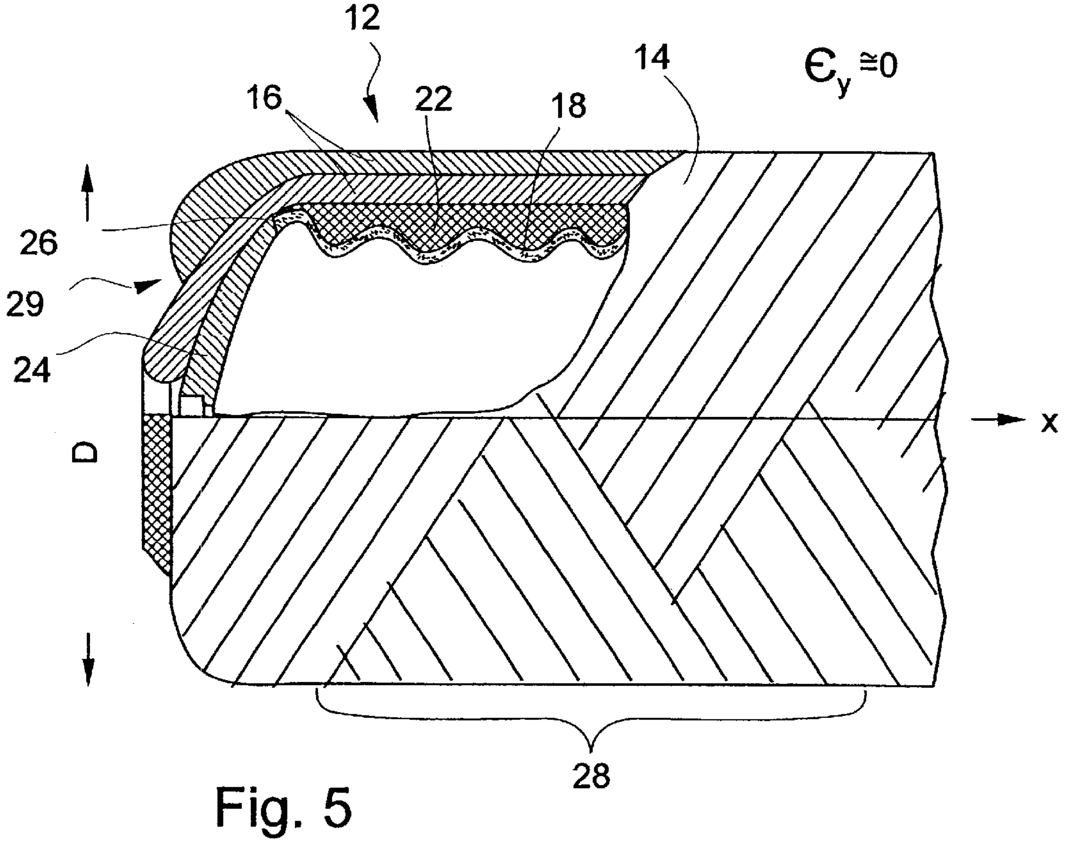
FIG. 5 is a partially cut-away side view of the pressure vessel of FIG. 3.

FIGS. 3–5 illustrate the overall structure of pressure vessel 12 incorporating liner 18. As best seen in FIG. 5, the hermetically sealing shell of the pressure vessel is typically completed by metallic, dome-shaped end pieces 24 attached to the ends of liner 18. In contrast to prior art pressure vessels, the unstressed nature of liner 18 allows end pieces 24 to be connected at a welded joint 26.

Immediately adjacent to the outer surface of liner 18 is filler layer 22, substantially filling corrugations 20. Clearly, the word "filling" as used here in relation to corrugations 20 refers to filling of what appear from the outside to be "depression lines" corresponding to the recessed parts of the corrugation pattern. Alternatively, as considered relative to the internal volume of the liner, filler layer 22 may be considered to fill the "raised" inwardly-projecting parts of the corrugation pattern. Preferably, in addition to filling the corrugations, filler 22 also provides a substantially continuous layer so as to form a mechanically insulating sleeve between liner 18 and wall 16.

It is a particular feature of filler 22 that it has low resistance to change of shape so as to allow flexing of the corrugations to accommodate deformation. This condition is satisfied by using an "elastic" material, defined herein as a material having a modulus of elasticity of less than about $10^4$ $kg\cdot cm^{-2}$. Preferably, filler 22 is made from a material having a modulus of elasticity of less than about $10^3$, and typically less than about 100 $kg\cdot cm^{-2}$.

Preferably, in addition to the aforementioned elasticity, filler 22 exhibits a high resistance to compression under uniform pressure. Specifically, as will be explained below, filler 22 is preferably substantially incompressible, i.e., substantially retains its total volume, under the working conditions of the pressure vessel to the extent that liner 18 is supported by wall 16 without significant additional deformation due to compression of the filler. Examples of materials exhibiting the desired combination of elasticity and incompressibility include, but are not limited to, natural and synthetic rubber.

Around filler layer 22 are wound multiple layers of composite material, preferably in an axisymmetric configuration, to form load-bearing wall 16. The resulting wall 16 typically includes a generally cylindrical wall portion 28 along the length of liner 18 and dome-shaped end portions 29 which retain end pieces 24. The materials used for producing the composite material layers may be selected from any of the range of fiber materials and resin matrices conventionally used in the art.

Figure 6:
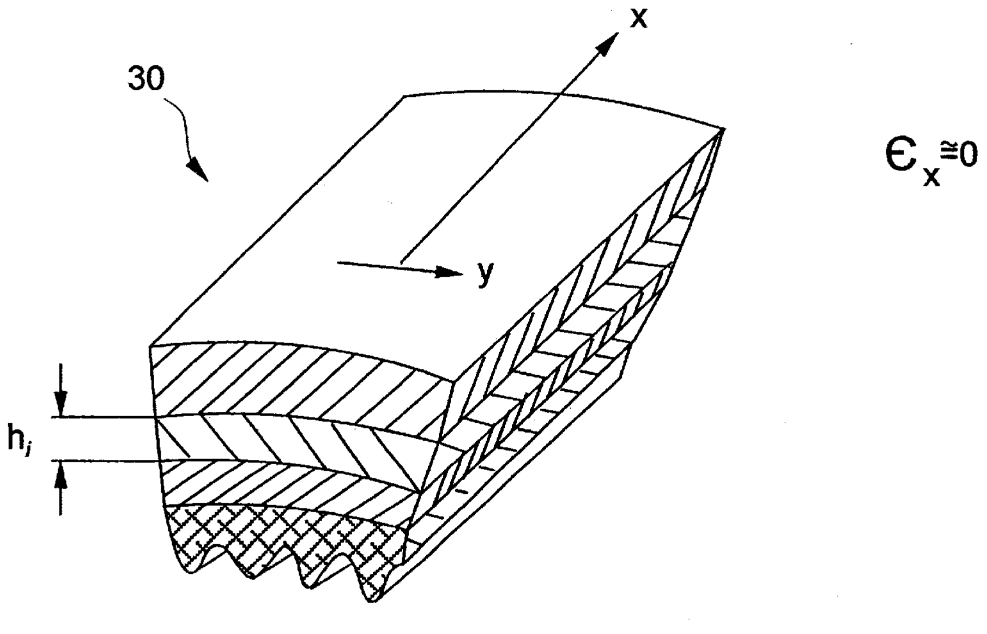
FIG. 6 is a view equivalent to FIG. 4 for a pressure vessel according to the second embodiment of the present invention.

Turning now briefly to FIG. 6, this shows a section, generally designated 30, from a second embodiment of a pressure vessel constructed and operative according to the teachings of the present invention. Section 30 is similar to the section illustrated in FIG. 4, except that corrugations 20 here extend parallel to the "x" direction. The requirements of the overall vessel structure correspondingly become that the strain transferred to the liner is near-zero in the "x" direction.

In all other respects, the structure and operation of the second embodiment will be fully understood by analogy to the first embodiment described above.

As mentioned above, it is a particular feature of the pressure vessels of the present invention that the shape of primary container 14, the reinforcing directions of the fiber-reinforced composite material, and the mechanical properties of filler layer 22 are configured such that, under a given change in the pressure of the contained fluid, a strain caused in liner 18 parallel to the length of corrugations 20 is at least one order of magnitude less than a corresponding strain in a direction perpendicular to the length of the corrugations. As implied by this statement, both the shape of the vessel and the properties of the filler layer may vary, thereby affecting the required characteristics of the composite material. For example, if a compressible filler is used, the fiber structure can be designed to exhibit negative deformation in the direction parallel to the corrugations so that the liner exhibits near-zero net stress in that direction. However, for ease of analysis, the theoretical treatment of design of a pressure vessel according to the present invention will be limited to a preferred case in which the vessel is substantially cylindrical and the filler is substantially incompressible. In this case, the required condition for the composite material may be expressed simply as near-zero strain in wall 16 in a direction parallel to the length of the corrugations.

Before addressing the theoretical treatment, reference is made to a text entitled "Mechanics of Composite Materials" (Robert M. Jones, 1975, Scripta Book Company, Washington, D.C.) which is hereby incorporated by reference. This text, and in particular sections 2.6 and 4.5.4 thereof, present the theoretical treatment which serves as the basis for the following analysis.

The following treatment characterizes the properties of the $i^{th}$ layer of the composite material in terms of its elastic moduli $E_1^i$, $E_2^i$, $G_{12}^i$, its Poisson coefficient $\mu_{12}^i$, its winding angle $\phi_i$ (see FIG. 1), and its thickness $h_i$. The average elastic characteristics for a symmetrically reinforced structure (i.e., for each winding layer with angle $+\phi_i$ there is a corresponding layer with angle $-\phi_i$) are:

$$B_{11}=\sum_{i=1}^{k} h_i(\overline{E}_1^{\,i}\cos^4\varphi_i+2\overline{E}_1^{\,i}\mu_{12}^i\sin^2\varphi_i\cos^2\varphi_i+\overline{E}_2^{\,i}\sin^4\varphi_i+G_{12}^i\sin^2 2\varphi_i)$$

$$B_{12}=\sum_{i=1}^{k} h_i[(\overline{E}_1^{\,i}+\overline{E}_2^{\,i})\sin^2\varphi_i\cos^2\varphi_i+\overline{E}_1^{\,i}\mu_{12}^i(\sin^4\varphi_i+\cos^4\varphi_i)-G_{12}^i\sin^2 2\varphi_i]$$

$$B_{22}=\sum_{i=1}^{k} h_i(\overline{E}_1^{\,i}\sin^4\varphi_i+2\overline{E}_1^{\,i}\mu_{12}\sin^2\varphi_i\cos^2\varphi_i+\overline{E}_2^{\,i}\cos^4\varphi_i+G_{12}^i\sin^2 2\varphi_i)$$

$$\overline{E}_{1,2}^{\,i}=\frac{E_{1,2}^i}{1-\mu_{12}^i\mu_{21}^i};\ E_1^i\mu_{12}^i=E_2^i\mu_{21}^i$$

Under axisymmetric loading, the in-plane forces $N_x$, $N_y$ are:

$$N_x=B_{11}\epsilon_x+B_{12}\epsilon_y$$

$$N_y=B_{12}\epsilon_x+B_{22}\epsilon_y$$

where $\epsilon_x,\epsilon_y$ are the in-plane strains. It follows that:

$$\varepsilon_x=\frac{B_{22}N_x-B_{12}N_y}{B_{11}B_{22}-B_{12}^2};\ \varepsilon_y=\frac{B_{11}N_y-B_{12}N_x}{B_{11}B_{22}-B_{12}^2}$$

For a cylindrical shell under internal pressure:

$$N_y=2N_x$$

It follows from the above that $$\epsilon_x=0 \text{ if } B_{22}=2B_{12}$$

and that $$\epsilon_y=0 \text{ if } 2B_{11}=B_{12}$$

Using net-theory approximations, the following simplified relations may be obtained:

$$\varepsilon_x=0 \text{ if } \sum_{i=1}^{k} E_1^i h_i\sin^2\varphi_i(3\cos^2\varphi_i-1)=0$$

$$\varepsilon_y=0 \text{ if } \sum_{i=1}^{k} E_1^i h_i\cos^2\varphi_i(3\cos^2\varphi_i-1)=0$$

It will be noted that, for the 54°45' angle proposed by the aforementioned Ponemon reference, the factor $(3\cos^2\phi_i-1)$ is zero. As a result, these equations would appear to indicate that a single layer with a winding angle of 54°45' would satisfy simultaneously the above conditions for $\epsilon_x=0$ and $\epsilon_y=0$, i.e., would exhibit zero deformation in all directions under applied pressure, which clearly cannot be true. This is indicative of the aforementioned singularity which occurs in the region of this winding angle, as a result of which the net theory approximations become unreliable. In fact, it is not possible to produce a stable structure with zero deformation in a given direction when using a single winding angle.

Instead, the present invention employs layers employing at least two non-equal filament winding angles. Furthermore, in preferred implementations, at least two different fiber materials with differing elastic properties are used in order to ensure proper distribution of stresses between the layers. By varying the winding angles, layer thicknesses and the elastic properties of the fiber materials used, it is possible simultaneously to satisfy the above conditions together with optimal distribution of stresses in the layers.

For example, for $\epsilon_x=0$ corresponding to an implementation of the invention with corrugations extending longitudinally, calculations were performed for layers of glass and carbon fibers which have a ratio of elastic moduli of 1:3. The following parameters were found to satisfy the required conditions:

glass reinforcing layer: $\phi_1=90.00°$, carbon reinforcing layer: $\phi_2=35.26°$, with $h_1=h_2$.

Preferably, the winding angles of the layers are chosen in accordance with the materials used such that the deformation in each layer for a given applied pressure corresponds to approximately the same proportion of the maximum permitted stress for each layer. The above example satisfies this criterion on the basis of an assumption that the maximum permitted stress for the glass and carbon fibers is approximately equal. This ensures maximum efficiency of use of each layer.

It is an additional preferred feature of certain implementations of the present invention that the internal structure of the fiber-reinforced composite material is configured so as to generate an effective coefficient of thermal expansion (CTE) of wall 16 as measured along the direction parallel to corrugations 20 which is substantially equal to that of liner 18. This condition can be achieved by selecting the layer thicknesses and reinforcement angles to satisfy an additional set of equations set out below. In the direction perpendicular to the corrugations, the corrugations flex to conform to the thermal expansion of wall 16.

The coefficients of thermal expansion for a symmetrically reinforced structure are:

$$\alpha_x = \frac{B_{1t} \cdot B_{22} - B_{2t} \cdot B_{12}}{B_{11} B_{22} - B_{12}^2}$$

$$\alpha_y = \frac{B_{2t} \cdot B_{11} - B_{1t} \cdot B_{12}}{B_{11} \cdot B_{22} - B_{12}^2}$$

where $$B_{1t} = \sum_{i=1}^{k} h_i [E_1^{-i}(\alpha_1^i + \mu_{12}^i \alpha_2^i)\cos^2\varphi_i + E_2^{-i}(\alpha_2^i + \mu_{21}^i \alpha_1^i)\sin^2\varphi_i]$$

$$B_{2t} = \sum_{i=1}^{k} h_i [E_1^{-i}(\alpha_1^i + \mu_{12}^i \alpha_2^i)\sin^2\varphi_i + E_2^{-i}(\alpha_2^i + \mu_{21}^i \alpha_1^i)\cos^2\varphi_i]$$

and $\alpha_1{}^i$ and $\alpha_2{}^i$ are coefficients of thermal expansion for unidirectional material in fiber direction and perpendicular direction, respectively.

It will be appreciated that the above descriptions are intended only to serve as examples, and that many other embodiments are possible within the spirit and the scope of the present invention.

What is claimed is:

1. A pressure vessel for containing a fluid at elevated pressure, the pressure vessel comprising:

(a) a primary load-bearing container formed with at least one wall made of fiber-reinforced composite material including at least a first layer having a first reinforcing direction and a second layer having a second reinforcing direction non-parallel to said first reinforcing direction, the shape of said primary container and said reinforcing directions of said layers being configured such that, under variations in the pressure of the contained fluid within a given range, a strain of said wall in a first direction is at least one order of magnitude less than a corresponding strain in a second direction perpendicular to said first direction;

(b) an unstressed corrugated metallic liner positioned adjacent to at least part of an inner surface of said wall and forming part of a hermetic seal within said primary container, said liner having corrugations extending substantially parallel to said first direction such that said liner conforms to deformation of said wall in said second direction; and (c) a filler layer of elastic material interposed between said liner and said wall so as to substantially fill raised portions of said corrugations.

2. The pressure vessel of claim 1, wherein said first layer includes fibers having a first modulus of elasticity and said second layer includes fibers having a second modulus of elasticity different from said first modulus of elasticity.

3. The pressure vessel of claim 1, wherein said filler forms a substantially contiguous layer between said liner and said inner surface of said wall.

4. The pressure vessel of claim 1, wherein said filler is substantially incompressible.

5. The pressure vessel of claim 1, wherein said filler has a module of elasticity of less than about $10^4$ kg·cm$^{-2}$.

6. The pressure vessel of claim 1, wherein said primary container has a cylindrical portion and dome-shaped end portions, said liner being deployed along substantially all of the inner surface of said cylindrical portion.

7. The pressure vessel of claim 6, wherein said corrugations form circumferential rings within said cylindrical portion.

8. The pressure vessel of claim 6, wherein said corrugations extend parallel to a central axis of said cylindrical portion.

9. The pressure vessel of claim 1, wherein said hermetic seal is completed by at least one additional metallic element, said additional metallic element being sealingly connected to said liner by welding.

10. The pressure vessel of claim 1, wherein said liner is made from metallic material having a given coefficient of thermal expansion, and wherein the internal structure of said fiber-reinforced composite material is configured so as to generate an effective coefficient of thermal expansion of said wall as measured along said first direction substantially equal to said given coefficient.

11. A pressure vessel for containing a fluid at elevated pressure, the pressure vessel comprising:

(a) an unstressed corrugated metallic liner forming part of a hermetic seal, said liner having corrugations extending substantially parallel to a first direction such that said liner accommodates deformation in a second direction perpendicular to said first direction, said liner having an external surface;

(b) a filler layer of elastic material disposed as a substantially contiguous layer adjacent to said external surface of said liner and substantially filling said corrugations; and (c) a primary load-bearing container surrounding said hermetic seal, said primary container being formed with at least one wall made of fiber-reinforced composite material adjacent to said filler layer, wherein said fiber-reinforced composite material includes at least a first layer having a first reinforcing direction and a second layer having a second reinforcing direction non-parallel to said first reinforcing direction, the shape of said primary container, the reinforcing directions of said fiber-reinforced composite material, and the mechanical properties of said filler layer being configured such that, under variations in the pressure of the contained fluid over a given range, a strain caused in said liner parallel to said first direction is at least one order of magnitude less than a corresponding strain in said second direction.

12. The pressure vessel of claim 11, wherein said first layer includes fibers having a first modulus of elasticity and said second layer includes fibers having a second modulus of elasticity different from said first modulus of elasticity.

* * * * *